Aug. 2, 1960

M. R. VOCHT 2,947,435

HOUSING MEANS

Filed Sept. 24, 1957

INVENTOR.
MARTIN R. VOCHT

BY Arthur H. Swanson

ATTORNEY.

2,947,435
Patented Aug. 2, 1960

2,947,435
HOUSING MEANS

Martin R. Vocht, Philadelphia, Pa., assignor to Minneapolis-Honeywell Regulator Company, Minneapolis, Minn., a corporation of Delaware Filed Sept. 24, 1957, Ser. No. 685,957

1 Claim. (Cl. 220—4)

This invention relates to housing means, and more particularly to housing means for electronic apparatus.

It is an object of the present invention to provide an improved housing means for electronic apparatus such as to constitute a unified subassembly package for use in conjunction with other apparatus.

It is another object of this invention to provide a housing means as set forth wherein the housing comprises a mounting means for the electronic apparatus as well as constituting a heat sink therefor.

It is another object of the present invention to provide a housing means as set forth which is characterized in being universally adapted for mounting in any of several positions.

Still another object of the present invention is the provision of an improved housing means as set forth which is further characterized in the presentation of ready access to the structure housed therein for maintenance or adjustment.

In accomplishing these and other objects, there has been provided, in accordance with this invention, a molded metal main housing member having two adjacent sides open. A unitary cover made of a suitable non-metallic sheet material is provided which covers the two open sides of the housing. The cover is stiff but flexible and is secured to the main housing member in such a manner as to be quickly removable. Means are provided whereby the housing member may be secured to supporting structure from the bottom thereof, from one of the ends, or by means of mounting rod or screw running parallel to the center line of one of the sides.

A better understanding of this invention may be had from the following detailed description when read in connection with the accompanying drawing, in which.

Figure 1:
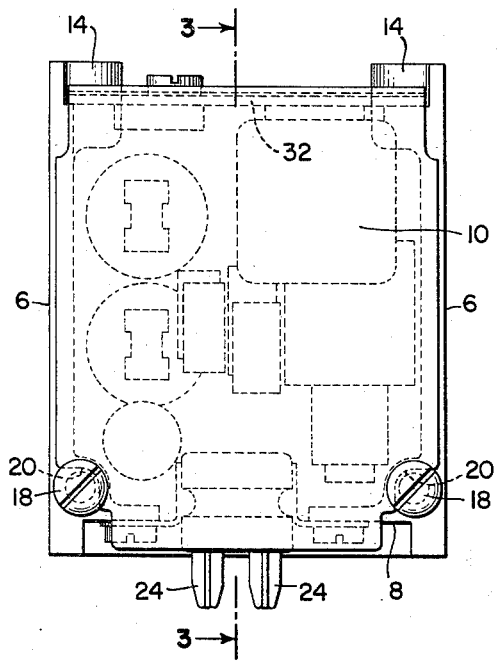
Fig. 1 is a plan view partly in phantom, of apparatus embodying present invention.

Referring to the drawing in more detail, there is shown a housing means for electronic apparatus such, for example, as a transistor oscillator. The housing means includes a main housing member 2 made of, for example, diecase aluminum. The main housing member 2 is formed with a bottom 4, two side walls 6, and one end wall 8. This leaves the other end and the top open. A separate unitary cover member 10 is formed of a suitable sheet material, preferably of a phenolic resin compound.

The mass of the metal of the housing member also serves an additional function. In the event that the contained apparatus is a transistor circuit, the metal housing constitutes a heat sink. This helps to maintain a measure of stability in the temperature of the transistors, thereby helping to stabilize the operation thereof.

The main housing member is provided, adjacent the open end, with a recess 12 which is open toward the bottom of the main housing member. This recess may best be seen in Figs. 3 and 4. A second recess 14 perpendicular to the first mentioned recess is provided in the end of the end of the bottom 4 adjacent to the open end of the main housing member and of a depth sufficient to at least reach the plane defined by the first mentioned recess 12. This recess may be most clearly seen in Figs. 1 and 4. The cover member 10, as previously mentioned, is formed of sheet material and is bent at substantially right angles to cover the two open surfaces of the main housing member. One end of the cover member 10 is contoured in such a way that a pair of projections 16 are provided which fit into and are received by the first mentioned recess 12. The contour also provides a narrow portion which is fitted within the second recess 14. This arrangement provides means for securing the one end of the cover member to the main housing member. Further means are provided for securing the other end of the cover member 10 to the main housing member 2. This further means comprises a pair of headed fastening devices, such as screws 18, positioned adjacent the closed end wall 8 of the main housing member and extending in the direction of the open top. The cover member 10 is contoured to provide co-operating notches 20 which engage the fastening means 18 and are held in position by the heads thereof.

The cover member, being made of sheet material, although being relatively stiff, is as characterized in a measure of flexibility. This being the case, it may be seen that the cover member 10 may be readily removable from the main housing member 2 by slightly loosening the fastening means 18, sliding the cover member in a direction to disengage the notches 20 from the fastening means by flexing the cover member at the bend thereof until it is completely disengaged from the fastening means 18. The cover member may be then completely removed from the main housing member by swinging the cover open until the projections 16 disengaged from the recess 12. It is equally apparent that the cover member may be readily replaced on the housing member simply by reversing the foregoing process. Thus, the cover member may be readily removed from the housing structure to provide convenient access to the apparatus housed therein, and equally readily replaced when access to the housed apparatus is no longer needed.

Provision is also made for rendering the foregoing housing structure readily mountable on suitable cooperating and supporting structure in any of several desired positions. First it will be seen that means are provided for receiving mounting screws in the surface of the housing member which has here been designated as the bottom 4. This means is represented in the drawing as the threaded holes 22. By virtue of the arrangement of these threaded holes, it may be seen that the housing member may be firmly secured to a supporting structure by screws passing through the structure into these holes 22.

If it is desired to mount the structure in the vertical position with the contact members 24, which serve to connect the contained apparatus with associated circuitry, in an upward direction, additional means are provided. This means is shown on the drawing as threaded holes 26 in the bosses 28 at the open end of the housing member 2. Again, it may be desired to secure the housing structure to co-operating elements with the end wall bearing the contact members 25 in substantial engagement with the supporting structure. This would be the case, for example, when the supporting structure includes complementary contact means for cooperative engagement with the contact means 24. For accommodating the mounting of the housing means in this relation, there is provided a pair of aligned orifices 28 thru the skirt member 30 depending from the bottom 4 of the main housing member 2 and extending about the periphery thereof. In this connection the housing structure is presented with the control member 24 in appropriate alignment with the cooperating receptacle and an elongated bolt is passed through the two aligned orifices and into a threaded hole in the supporting structure. The tightening of such a bolt provides two functions, that of drawing the control members into intimate engagement with the corresponding receptacle, and of releasably securing the housing member to the supporting structure.

Figure 3:
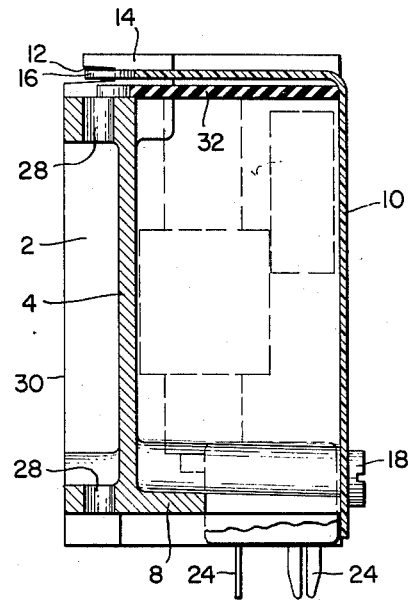
Fig. 3 is a cross-sectional view taken along the line 3—3 of Fig. 1 and viewed in the direction of the appended arrows.
Figure 2:
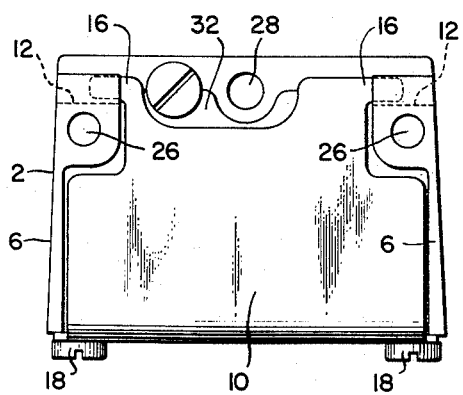
Fig. 2 is an end view of the apparatus shown in Fig. 1.
Figure 4:
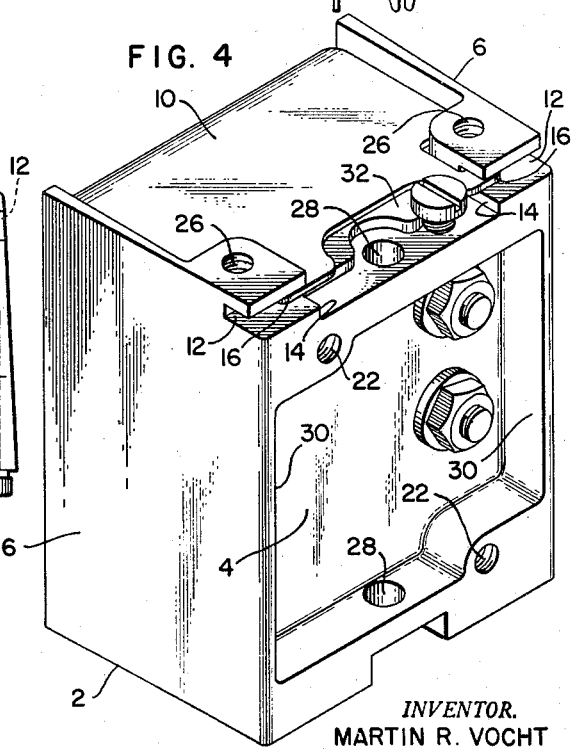
Fig. 4 is an isometric view of the apparatus shown in Fig. 1 and showing the bottom of the housing member.

In the drawing the electronic apparatus, which, is aforesaid may be a transistor oscillator, is diagrammatically represented by phantom lines in Figs. 1 and 3. The elements are illustrated as being connected to and at least particularly supported by an insulating terminal strip member 32.

Thus it may be seen that there has been provided in accordance with the present invention, an improved housing member for electronic apparatus and constituted a unified subassembly package which may be used in conjunction with other apparatus which is universally adaptable for mounting in any of several positions, and which presents ready access to the interior thereof for the maintenance or adjustment of the apparatus housed therein.

What is claimed is:

A housing means for electronic apparatus comprising a unitary metal main housing member defining a rectangular structure having a bottom, an end and two side members, said structure having one open end and an open top, said side member each having adjacent the open end a groove open toward said bottom, said bottom terminating adjacent said open end at a plane at least as far removed from the end of the side members as said grooves, a unitary cover member of sheet material formed to cover said open end and said top, said cover member having a pair of laterally extending tongues, said tongues being arranged to be hooked into said grooves to secure said cover member to said main housing member at one end, screw fastening means positioned on the top of said main housing means, said cover member being contoured at its opposite end for cooperative association with said screw fastening means as a means for securing said opposite end to said housing member, and said housing means being provided with means for mounting said housing means on a supporting structure in any of several positions, said last mentioned means comprising a pair of receiving means opening on said open end for receiving a pair of mounting screws, a similar pair of receiving means opening on said bottom for receiving a pair of mounting screws, said bottom having a downwardly extending skirt as an extension of said side members and ends, said skirt having a pair of aligned openings through the opposite end portions for the reception of a unitary mounting bolt.

References Cited in the file of this patent

UNITED STATES PATENTS

| | | |
|---|---|---|
| 700,060 | Loomis | May 13, 1902 |
| 1,770,327 | Thayer | July 8, 1930 |
| 1,887,192 | Betts | Nov. 8, 1932 |
| 2,143,158 | Lefkowitz | Jan. 10, 1939 |
| 2,511,774 | Goldsmith | June 13, 1950 |
| 2,604,524 | McCaine | July 22, 1952 |
| 2,779,459 | Waterman | Jan. 29, 1957 |

FOREIGN PATENTS

| | | |
|---|---|---|
| 107,902 | Sweden | May 13, 1943 |